(12) United States Patent
Popovic

(10) Patent No.: US 7,751,490 B2
(45) Date of Patent: Jul. 6, 2010

(54) METHOD AND APPARATUS OF ESTABLISHING A SYNCHRONIZATION SIGNAL IN A COMMUNICATION SYSTEM

(75) Inventor: Branislav M. Popovic, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/607,790

(22) Filed: Oct. 28, 2009

(65) Prior Publication Data
US 2010/0034305 A1    Feb. 11, 2010

Related U.S. Application Data

(63) Continuation of application No. PCT/CN2008/070844, filed on Apr. 29, 2008.

(30) Foreign Application Priority Data
May 2, 2007    (SE) .................... 0701056

(51) Int. Cl.
*H04K 1/10* (2006.01)
(52) U.S. Cl. ...................... 375/260; 370/350
(58) Field of Classification Search ............. 375/260, 375/259; 370/350
See application file for complete search history.

(56) References Cited

U.S. PATENT DOCUMENTS

| 7,145,955 | B1 | 12/2006 | Böhnke et al. |
| 7,570,684 | B2 | 8/2009 | Zhang et al. |
| 2006/0133526 | A1 | 6/2006 | Zhang et al. |
| 2007/0165727 | A1 | 7/2007 | Fanson |
| 2007/0183306 | A1 | 8/2007 | Akita et al. |
| 2007/0183391 | A1 * | 8/2007 | Akita et al. ............. 370/350 |
| 2008/0002566 | A1 | 1/2008 | Zhang et al. |
| 2009/0052567 | A1 | 2/2009 | Yang et al. |

FOREIGN PATENT DOCUMENTS

| CN | 1780276 A | 5/2006 |
| EP | 1 505 787 A2 | 2/2005 |
| EP | 1 530 336 A1 | 5/2005 |
| WO | WO 2007/082372 A1 | 7/2007 |
| WO | WO 2007/102123 A1 | 9/2007 |

OTHER PUBLICATIONS

Huawei, "Cell-specific signals for initial synchronization and cell identification," 3GPP Draft; R1-060225, 3rd Generation Partnerhsip Project (3GPP), 3GPP TSG RAN WG1 LTE Ad Hoc, Helsinki, Finland, Jan. 23-25, 2006, 11 pages.

(Continued)

*Primary Examiner*—Emmanuel Bayard
(74) *Attorney, Agent, or Firm*—Slater & Matsil, L.L.P.

(57) ABSTRACT

A method of establishing a synchronization signal in a communication system is disclosed. A set of discrete Fourier frequency coefficients is defined and transformed into a discrete time representation, the discrete time representation being particularly useful as a synchronization signal. According to example embodiments of the invention, signal symmetry is exploited. Preferably, the center frequency, also referred to as DC subcarrier, is not used for transmission. The invention also concerns a transmitter and receiver of a communication system.

15 Claims, 5 Drawing Sheets

OTHER PUBLICATIONS

Panasonic, et al., "RACH Zadoff-Chu sequence definition and allocation," 3GPP Draft; R1-071111, $3^{rd}$ Generation Partnerhsip Project (3GPP), TSG-RAN WG1, Meeting #48, St. Louis, U.S.A., Feb. 12-16, 2007, 3 pages.

NEC Group. "Package of PSC and SSC proposals for LTE cell search" 3GPP Draft; R1-071497, $3^{rd}$ Generation Partnerhsip Project (3GPP), RAN WG1, Meeting 48bis, Malta, Mar. 26-30, 2007, 13 pages.

Huawei, "P-SCH sequences," 3GPP Draft, R1-072321, $3^{rd}$ Generation Partnerhsip Project (3GPP), TSG RAN WG1, Meeting #49, Kobe, Japan, May 7-11, 2007, 6 pages.

European Search Report, EP 08 73 4202, Applicant Huawei Technologies Co., Ltd., Jan. 20, 2010, 9 pages.

* cited by examiner

US 7,751,490 B2

METHOD AND APPARATUS OF ESTABLISHING A SYNCHRONIZATION SIGNAL IN A COMMUNICATION SYSTEM

This application is a continuation of International Application No. PCT/CN2008/070844, filed on Apr. 29, 2008, entitled "Method and Apparatus of Establishing a Synchronisation Signal in a Communication System," which claims the priority of application No. SE 0701056.4 filed on May 2, 2007. Both applications are incorporated herein by reference in their entirety.

FIELD OF THE INVENTION

The present invention relates to communications and synchronization. More particularly, the invention relates to, e.g., synchronization in OFDM (Orthogonal Frequency Division Multiplex) systems.

BACKGROUND

3GPP Technical Specification, 3GPP TS 36.211 v10.0, 3rd Generation Partnership Project, Technical Specification Group Radio Access Network, Physical Channels and Modulation (Release 8), France, March 2007, describes physical channels for evolved UTRA, Universal Terrestrial Radio Access.

When specifying a synchronization scheme for a communication system, of course many parameters have to be weighed in order to optimize, in some sense, the performance of the system. That would be true both for the specific synchronization performance, where perhaps improving one design parameter may worsen another and vice versa, but also for the performance of the communication system as a whole due to the chosen synchronization scheme. For instance, for a wireless system there may be constraints on terminals in terms of power consumption, cost of device, radio reception sensitivity and so forth. Such constraints on communication systems and their constituents can be imposed both by standard regulating bodies, as well as by manufacturers themselves wanting to maximize income generating power of their products. Designers of communication systems designing synchronization schemes must bear these problems of design in mind.

A document for agenda item 7.2 of RAN WG1 meeting 48bis titled, *Package of PSC and SSC proposals for LTE cell search*, R1-071497 *Malta, Mar.* 26-30, 2007, proposes a package of Primary Synchronization Codes, PSC, and Secondary Synchronization Codes, SSC, design for LTE cell search. The document presents a solution to the problem of how to design PSC synchronization sequences being Zadoff-Chu sequences of length 71, with root indices u=1, 5 and 70.

Another document for agenda item 7.2 of RAN WG1 meeting 48bis titled, *Comparison of sequence and structure for P-SCH*, R1-071531 *Malta, Mar.* 26-30, 2007, presents another proposal on how to design synchronization for E-UTRA. In the document, it was proposed to use Zadoff-Chu sequences of length 72, with no specified root indices u.

A further document for agenda item 5.1.3.4 of 3GPP TSG RAN WG1 LTE Ad Hoc titled, *Cell-specific signals for initial synchronization and cell identification*, R1-060225, *Helsinki, Finland, Jan.* 23-25, 2006, introduces centrally symmetric signals and a blind reverse differential correlation detection algorithm for detection of the signals without knowledge of their exact waveform. The document also stresses the importance of PAPR (Peak-to-Average-Power-Ratio) values and concludes that all the OFDM synchronization signals, based on different Golay sequences from a set of orthogonal complementary pairs will have small PAPR values, allowing in that way the maximization of the average transmitted power, i.e., the maximization of the received SNR, signal-to-noise ratio, at the cell edge.

SUMMARY

An object of example embodiments of the invention is to provide efficient synchronization for communications. According to an example embodiment of the invention, a method of establishing a synchronization signal includes defining a set of discrete Fourier frequency coefficients and transforming the set of discrete Fourier frequency coefficients into a discrete time representation. The method is particularly suitable for a matched filter receiver in a communication system.

Further, the communication system is preferably prepared for using the discrete time representation as the synchronization signal in the communication system.

The set of discrete Fourier frequency coefficients is preferably defined so as to be centrally symmetric or is achieved from a mapping of a number sequence being centrally symmetric.

Specifying a synchronization signal based on Fourier frequency coefficients being centrally symmetric provides the advantage of allowing for an efficient implementation of a corresponding bank of correlators in, e.g., a receiver receiving such a signal.

Another demonstrated merit of an embodiment of the invention is advantageous Peak-to-Average-Power-Ratio, PAPR.

An object of a preferred example embodiment of the invention is to devise an improved or alternative synchronization scheme for a matched filter receiver.

According to the invention, an example transmitter for a communication system is provided, the transmitter being arranged to send a synchronization signal to, e.g., a matched filter receiver in the communication system. The synchronization signal is preferably established from:

defining a set of discrete Fourier frequency coefficients; and transforming the set of discrete Fourier frequency coefficients into a discrete time representation.

Further, the transmitter is preferably arranged to use the discrete time representation as the synchronization signal in the communication system.

In a preferred mode of the invention, the discrete time representation is such that the set of discrete Fourier frequency coefficients is centrally symmetric.

According to yet another aspect of the invention, an example receiver of, preferably, matched filter type for a communication system is disclosed. The receiver is arranged to receive a synchronization signal in the communication system and is adapted to the synchronization signal as established by:

defining a set of discrete Fourier frequency coefficients, transforming the set of discrete Fourier frequency coefficients into a discrete time representation, where the receiver is preferably arranged to receive the discrete time representation as the synchronization signal in the communication system.

In a preferred mode, the discrete time representation is such that the set of discrete Fourier frequency coefficients is centrally symmetric.

According to yet another example aspect of the invention, a communication system includes:

a transmitter arranged to send a synchronization signal; and a receiver, preferably of matched filter type, arranged to receive the synchronization signal;

where the synchronization signal is established from:

a set of discrete Fourier frequency coefficients being defined, and the set of discrete Fourier frequency coefficients being transformed into a discrete time representation, where the transmitter and receiver preferably is arranged to transmit and receive, respectively, the discrete time representation as the synchronization signal.

In preferred modes of the invention, the transmitter and receiver are arranged to use the discrete time representation as the synchronization signal. The discrete time representation is such that the set of discrete Fourier frequency coefficients is centrally symmetric.

BRIEF DESCRIPTION OF THE DRAWINGS

Embodiments exemplifying the invention are described by means of the appended drawings in which.

DETAILED DESCRIPTION

Downlink signals in, e.g., an E-UTRA cellular system, based on OFDM transmission technology, are specified not to use the central frequency in the available bandwidth, the so-called DC subcarrier, for transmission. A reason for this is that potential local-oscillator leakage, which can occur either in the transmitter of the base station or in the receiver of the mobile User Equipment, UE, can cause significant interference to the DC subcarrier, and thus make it practically unusable.

The E-UTRA cellular system is specified to use multiple (three) Primary Synchronization, P-SCH, signals, transmitted on the Down-Link, DL, to support the OFDM symbol timing synchronization at the UE. The three P-SCH signals are tied to the cell identities within a cell identity group, serving in that way both for timing synchronization purposes and information transmission.

Figure 3:
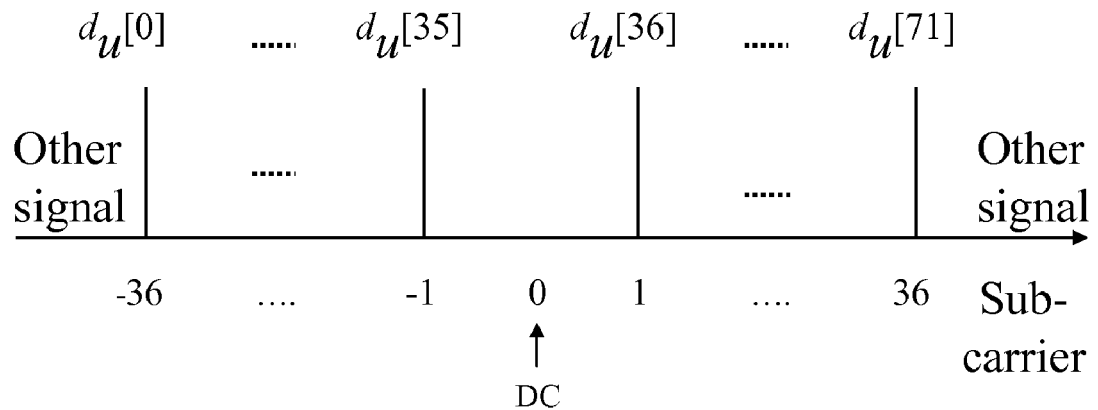
FIG. 3 illustrates schematically a resulting mapping of a P-SCH sequence to subcarriers, according to an embodiment of the invention.

The P-SCH signals have non-repetitive structure, and are based on the Zadoff-Chu, ZC, sequences. The P-SCH signals are OFDM signals with up to 72 active subcarriers, centered around the DC subcarrier. The active subcarriers are modulated with the elements of a cell-specific P-SCH sequence $d_u[n]$ selected from a set of three different ZC sequences with root indices u=u1, u2 and u3. The resulting mapping of an example P-SCH sequence $d_u[n]$, n=0, . . . , 71, of length L=72, to available subcarriers is schematically illustrated in FIG. 3. Reception at the UE of the synchronization signal is preferably by way of a matched filter receiver. A matched filter can be shown to maximize the signal to noise ratio at the output of the filter in the instant of complete reception of the signal. The impulse response of the matched filter for the signal that has passed the Additive White Gaussian Noise, AWGN, channel is equal to the time-reversed version of the transmitted signal. Such matched filters are used in practice even if the propagation channel is not AWGN, as a good approximation of the exact matched filter for such non-AWGN channels would require the knowledge of the channel correlation function.

Comparing the two proposals from RAN WG1 meeting 48bis, a trade-off made in the former is that one available subcarrier remains unused. This reduces the frequency diversity of the signal, making the signal more susceptible to the effects of the fading propagation channel. Larger reduction of the signal bandwidth would lead to broadening of the main autocorrelation lobe of the signals, which would mean reduced accuracy of signal timing estimation. A drawback of the latter proposal, *Comparison of sequence and structure for P-SCH*, R1-071531, compared to the former, *Package of PSC and SSC proposals for LTE cell search*, R1-071497, is that the maximum cross-correlations of multiple Primary Synchronization, P-SCH, signals obtained from the different root indices of Zadoff-Chu sequences of length 72 are higher than if the length of Zadoff-Chu sequences is 71.

In order to improve or provide an alternative to the prior art, example embodiments of this invention proposes a method, system and apparatus for establishing a synchronization signal, particularly well suited for a matched filter receiver, in a communication system. The method includes:

defining a set of discrete Fourier frequency coefficients, $H_u[l]$;

transforming the set of discrete Fourier frequency coefficients, $H_u[l]$, into a discrete time representation, $s_u[k]$; and preparing the communication system for use of the discrete time representation, $s_u[k]$, as the synchronization signal in the communication system.

The "preparing the communication system for use . . . ," includes making the communication system ready to use the specified synchronization signal, for instance: by storing the signal in a memory somewhere in the system; or programming parts of the communication system in order to make use of the synchronization signal, when transmitting or receiving.

The set of discrete Fourier frequency coefficients, $H_u[l]$, is preferably defined so as to be centrally symmetric. It will be shown below, that if the frequency representation is centrally symmetric then that is a necessary and sufficient condition for the discrete time representation $s_u[k]$ also to be centrally symmetric. This means that the matched filter receiver can be designed to be much more efficient than is the case for the abovementioned proposals of the RAN WG1 meeting 48bis.

One motivation of central symmetry of the signal in the embodiments of the present invention is a thereby achieved efficient implementation of a receiver, such as a matched filter receiver, for which the exact knowledge of the signal waveform is a prerequisite.

One way to define the set of discrete Fourier frequency coefficients in an example method according to the invention is to, for defining the set of discrete Fourier frequency coefficients, $H_u[l]$, include in the example method:

defining a number sequence, $d_u[n]$; and performing a mapping of the number sequence, $d_u[n]$ to arrive at the set of discrete Fourier frequency coefficients, $H_u[l]$, that is preferably centrally symmetric, This allows for a convenient way of defining the coefficients, $H_u[l]$, which also conforms with the standard in 3GPP Technical Specification, 3GPP TS 36.211 v1.0.0 and still retains the preferred property of central symmetry.

Further on the method according to the present invention, the defining a number sequence $d_u[n]$ preferably also includes defining the number sequence, $d_u[n]$, to be centrally symmetric.

Additionally, in a preferred embodiment of the invention the mapping is performed such as to have the set of discrete Fourier frequency coefficients $H_u[l]$ with a DC-carrier being zero. This would be beneficial in systems having a requirement for the DC-carrier to be zero, such as in 3GPP Technical Specification 3GPP TS 36.211 v1.0.0.

As an example, a mapping according to the method of the invention is performed in accordance with:

$$H_u[l] = \begin{cases} 0, & l = 0 \\ d_u\left[l + \frac{L}{2} - 1\right], & l = 1, 2, \ldots, \frac{L}{2} \\ d_u\left[l - N + \frac{L}{2}\right], & l = N - \frac{L}{2}, \ldots, N-1 \\ 0, & \text{elsewhere,} \end{cases} \quad \text{eq. 1}$$

where L is a length of the number sequence $d_u[n]$ and $N=L+1$ is the number of discrete Fourier frequency coefficients, $H_u[l]$. This mapping would conform both with the preferred requirement of mapping a centrally symmetric number sequence onto a set of centrally symmetric frequency coefficients as well as mapping the number sequence such that the set of frequency coefficients would have a DC-carrier being zero.

Defining the number sequence could for instance involve defining the number sequence as a centrally symmetric sequence, $d_u[n]$, being of length L and having a property such that $d_u[n]=d_u[L-1-n]$, $n=0, 1, \ldots, L/2-1$. So this would provide central symmetry of $d_u[n]$. The centrally symmetric number sequence, $d_u[n]$, could be defined by concatenating a number sequence of length L/2 and its reverted replica. As an example of this, a number sequence could be mentioned, where the centrally symmetric number sequence, $d_u[n]$, is obtained by concatenating a Zadoff-Chu sequence of length L/2 and its reverted replica, so that $d_u[n]$ is given by:

$$d_u[n] = \begin{cases} W_{L/2}^{un(n+(L/2)\bmod 2)/2}, & n = 0, 1, \ldots, L/2-1 \\ W_{L/2}^{u(L-1-n)(L-1-n+(L/2)\bmod 2)/2}, & n = L/2, \ldots, L-1. \end{cases} \quad \text{eq. 2}$$

where $W_N = e^{-j2\pi/N}$, for positive integers N.

Another way to obtain a centrally symmetric number sequence is by puncturing a central element of a Zadoff-Chu sequence of odd length L+1, so that $d_u[n]$ is given by:

$$d_u[n] = \begin{cases} W_{L+1}^{un(n+1)/2}, & n = 0, 1, \ldots, L/2-1 \\ W_{L+1}^{u(n+1)(n+2)/2}, & n = L/2, \ldots, L-1. \end{cases} \quad \text{eq. 3}$$

where $W_N = e^{-j2\pi/N}$, for positive integers N.

If the sequence $d_u[n]$ is centrally symmetric, such that:

$$d_u[n]=d_u[L-1-n], n=0, 1, \ldots, L/2-1 \quad \text{eq. 4}$$

then $H_u[l]$ in equation 1 will also be centrally symmetric around the DC. This is a sufficient and necessary condition for the time domain synchronization signal, $s_u[k]$, to be centrally symmetric, such that:

$$s_u[k]=s_u[N-k], k=1, \ldots, N-1. \quad \text{eq. 5}$$

It means that only the sample $s_u[0]$ does not have its symmetric counterpart. The proof of equation 5 is as follows: starting from the definition of $s_u[k]$, $$s_u[k] = \frac{1}{N}\sum_{n=0}^{N-1} H_u[n]W_N^{-kn}, \quad \text{eq. 6}$$

$$W_N = \exp(-j2\pi/N), j = \sqrt{-1},$$

$$k = 0, 1, 2, \ldots, N-1,$$

it follows that, $$s_u[N-k] = \frac{1}{N}\sum_{n=0}^{N-1} H_u[n]W_N^{kn} \quad \text{eq. 7}$$

$$= \frac{1}{N}\sum_{l=N}^{1} H_u[N-l]W_N^{-kl}$$

$$= \frac{1}{N}\sum_{l=0}^{N-1} H_u[N-l]W_N^{-kl},$$

$$k = 0, 1, 2, \ldots, N-1,$$

where we introduced the change of variables $n=N-1$, reordered the summation and used periodicity of the DFT $\{H_u[n]=H_u[n+N]\}$. From abovementioned relations, it follows that $s_u[k]=s_u[N-k]$ if $H_u[n]=H_u[N-n]$, which is a sufficient condition. It is also a necessary condition, meaning that only if $H_u[n]=H_u[N-n]$ it will be that $s_u[k]=s_u[N-k]$, as it can be shown by starting from the expression for $H_u[n]$.

In an applied case, if we define the centrally symmetric sequence to have a length L=72, we can compare its performance with that achievable from sequences of above-mentioned prior art proposals of RAN WG1 meeting 48bis. Compared to the first of these cited documents, it provides utilization of all available active subcarriers for P-SCH signals. Compared to both cited proposals of RAN WG1 meeting 48bis, it yields synchronization signals with very low pair-wise aperiodic cross-correlations, very low autocorrelation side lobes of synchronization signals, and low Peak-to-Average-Power-Ratio, PAPR, as will be discussed below.

Of course, the choice of the length L of $d_u[n]$ is not limited to this example length and would depend on the application. As an example, it is perfectly possible for the centrally symmetric sequence to have a length L=64.

In the method according to the invention, the transforming recited above, could include transforming of Fourier frequency coefficients, $H_u[l]$, $l=0, 1, \ldots N-1$, such that $$s_u[k] = \frac{1}{N}\sum_{l=0}^{N-1} H_u[l]W_N^{-kl},$$

$W_N = \exp(-j2\pi/N)$, $j=\sqrt{-1}$, $k=0, \ldots N-1$. This is the Inverse Discrete Fourier Transform. In a communication system where such a transforming is performed, it could be implemented with any suitable algorithm that enables fast computation. It is of course also possible to have the discrete time representation $s_u[k]$ calculated in advance and stored in a memory somewhere in the communication system.

The described method of establishing a synchronization signal in a communication system according to the invention could be used for establishing synchronization signals in different communication systems requiring some sort of synchronization, for instance, establishing such synchronization signals for a communication system being a wireless communication system. One example of such a wireless communication system is an OFDM-downlink channel in a cellular communication system. Such a system is described in 3GPP Technical Specification, 3GPP TS 36.211 v1.0.0.

It should be stated that all features of the method according to the invention described above and all their different alternatives can be combined arbitrarily, just as long as such combinations does not imply a self-contradiction.

As an example, we now use the insights of the invention applied to the case of a system according to the one specified in 3GPP Technical Specification, 3GPP TS 36.211 v1.0.0 and compare the performance of that applied case with that of the abovementioned prior art proposals of RAN WG1 meeting 48bis. As specified in 3GPP Technical Specification, 3GPP TS 36.211 v1.0.0, and shown in FIG. 3, the DC subcarrier cannot be used for mapping the elements of sequence $d_u[n]$, while the elements of $d_u[n]$ are mapped to all other consecutive, equally-spaced subcarriers around the DC subcarrier. The baseband P-SCH signal $s_u[k]$, $k=0, 1, \ldots, N-1$, from FIG. 3 is, e.g., obtained by N-point IDFT (Inverse Discrete Fourier Transform) of the spectrum of N Fourier coefficients $H_u[l]$ $l=0, 1, \ldots, N-1$, as:

$$s_u[k] = \frac{1}{N}\sum_{l=0}^{N-1} H_u[l]W_N^{-kl}, \; W_N = \exp(-j2\pi/N), j = \sqrt{-1}, \quad \text{eq. 8}$$
$$k = 0, 1, 2, \ldots, N-1,$$
and $$H_u[l] = \begin{cases} 0, & l = 0 \\ d_u\left[l + \frac{L}{2} - 1\right], & l = 1, 2, \ldots, \frac{L}{2} \\ d_u\left[l - N + \frac{L}{2}\right], & l = N - \frac{L}{2}, \ldots, N-1 \\ 0, & \text{elsewhere} \end{cases}, L = 72 \quad \text{eq. 9}$$

where $d_u[n]$, $n=0, 1, \ldots, L-1$, is the example P-SCH sequence of length L=72.

As an illustration, the proposal R1-071497 of RAN WG1 meeting 48bis describes P SCH sequences given by:

$$d_u[n]^{NEC} = \begin{cases} W_{71}^{un(n+1)/2}, & n = 0, 1, \ldots, 70 \\ 0, & n = 71 \end{cases}, u = 1, 70 \text{ and } 5 \quad \text{eq. 10}$$

Figure 1:
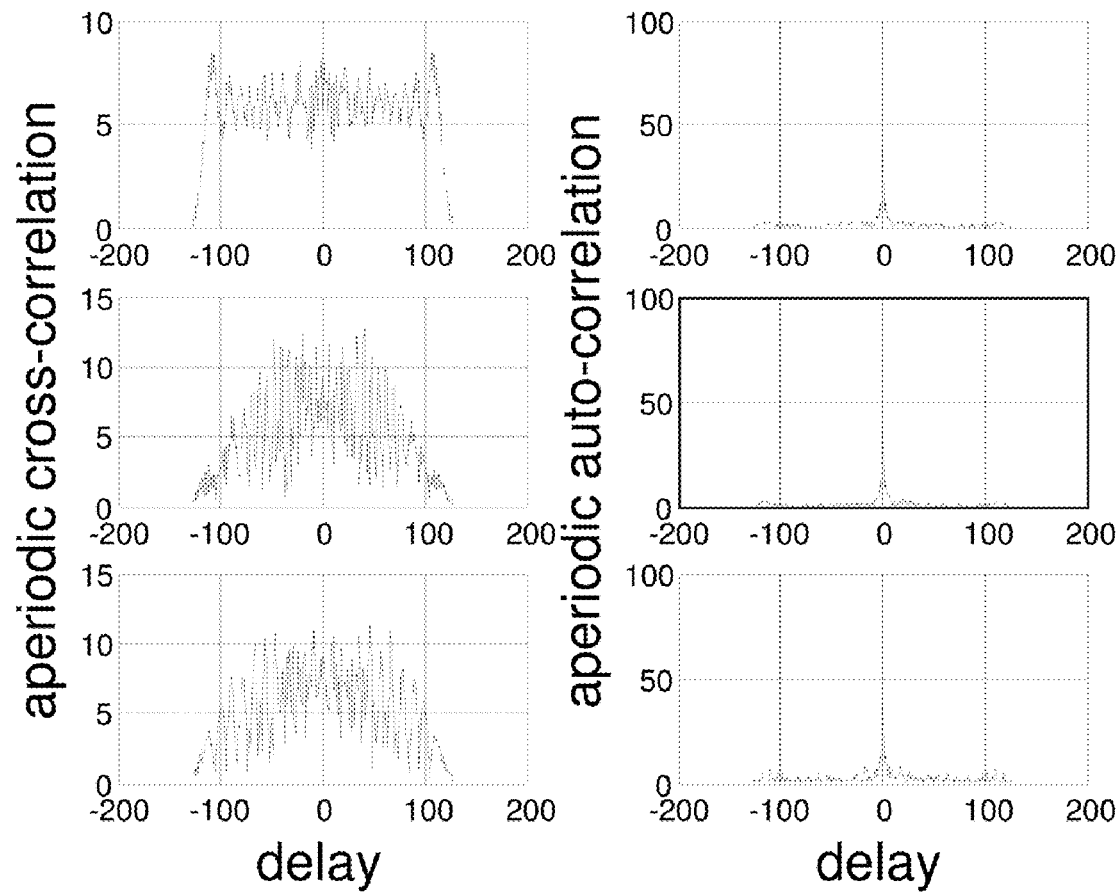
FIG. 1 illustrates, according to prior art, aperiodic correlation functions of P-SCH, Primary Synchronization Channel, signals from the document R1-071497 of RAN WG1 meeting 48bis, using 128 samples long correlators.

The aperiodic cross/auto-correlation functions of the P-SCH signals from R1-071497 of RAN WG1 meeting 48bis, for 128 samples long correlators, are shown in FIG. 1. The PAPR values of these signals are 3.14 dB, 3.14 dB and 4.66 dB.

As another illustration, the proposal R1-071531, of RAN WG1 meeting 48bis can be described by P-SCH sequences given by:

$$d_u[n]^{LGE} = W_{72}^{un^2/2}, n=0, 1, \ldots, 71 \quad \text{eq. 11}$$

Figure 2:
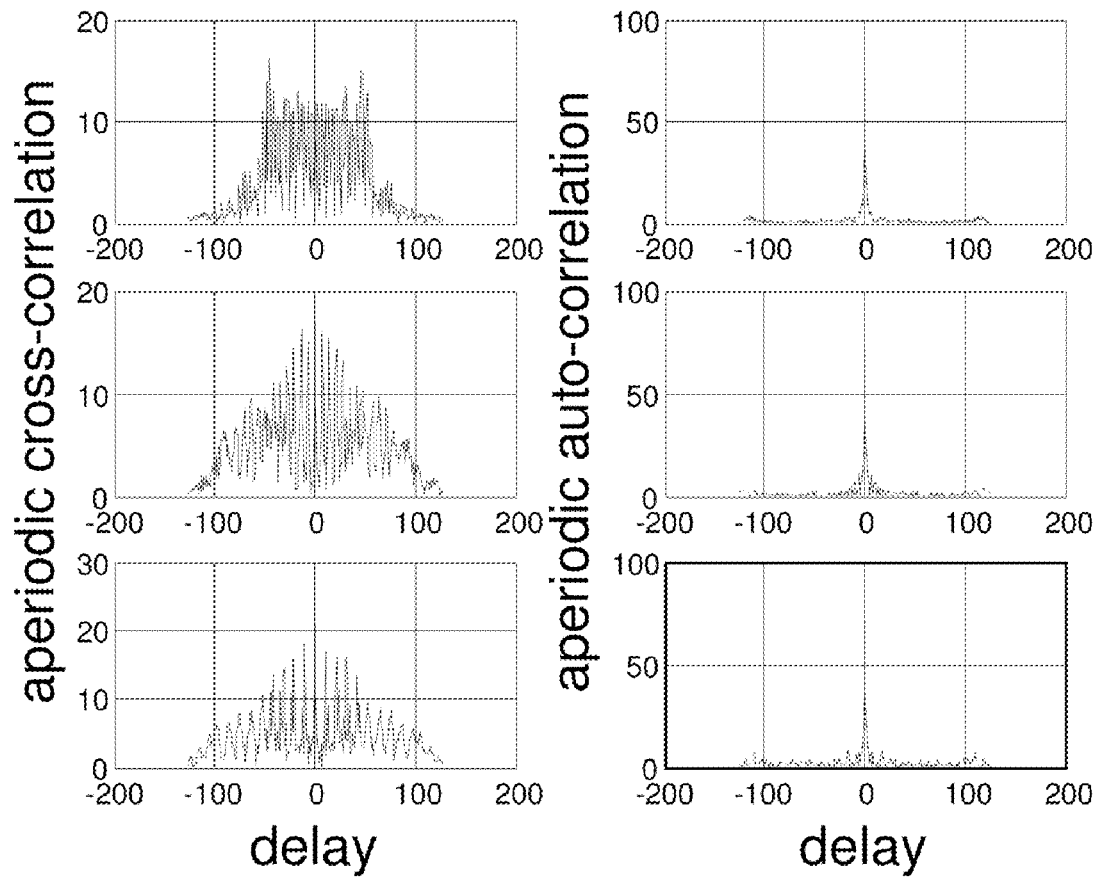
FIG. 2 illustrates, according to prior art, aperiodic correlation functions of P-SCH signals from the document R1-071531 of RAN WG1 meeting 48bis, using 128 samples long correlators.

The aperiodic cross/auto-correlation functions of the P-SCH signals in proposal R1-071531 from RAN WG1 meeting 48bis, for 128 samples long correlators, and for u=1, 71 and 5, are shown in FIG. 2. The PAPR values of these signals are 2.61 dB, 2.57 dB and 6.78 dB.

Figure 4:
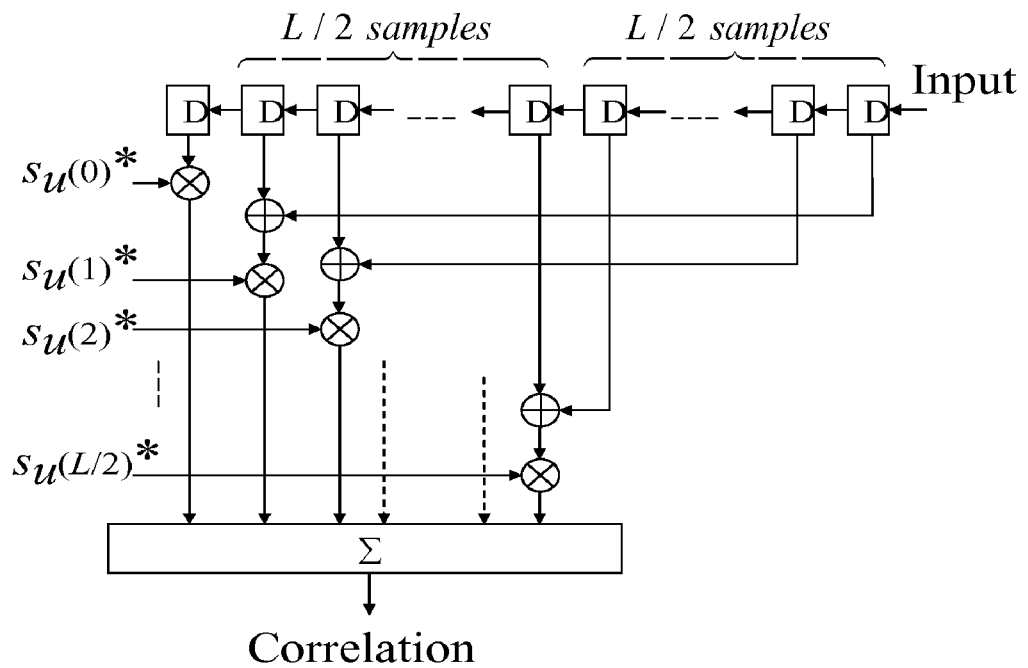
FIG. 4 illustrates schematically an efficient matched filter for P-SCH signal, defined by equation 5 for sequence lengths of N=L+1 samples, according to an embodiment of the invention.

The central symmetry of N-1 samples of a P-SCH signal can be used to reduce the number of multiplications in an example matched filter corresponding to the P-SCH signal. For example, if N=L+1=73, there are 72 centrally symmetric samples of P-SCH signal, so the matched filter can be implemented by 1+72/2=37 multiplications per single correlation, which is a reduction of about 50% compared to the direct implementation, which requires 73 multiplications. It is illustrated in FIG. 4, where "*" denotes complex conjugation.

Below, two procedures or ways to obtain an example P-SCH sequence, $d_u[n]$, which is centrally symmetric based on a Zadoff-Chu, ZC, sequence are discussed.

The first way is to concatenate the ZC sequence of length L/2 and its reverted replica. The corresponding P-SCH sequences, $d_u[n]$, are given by equation 12:

$$d_u[n] = \begin{cases} W_{L/2}^{un(n+(L/2)\text{mod}2)/2}, & n = 0, 1, \ldots, L/2-1 \\ W_{L/2}^{u(L-1-n)(L-1-n+(L/2)\text{mod}2)/2}, & n = L/2, \ldots, L-1 \end{cases}, L = 72 \quad \text{eq. 12}$$

The second way is to puncture the central element of a ZC sequence of odd length L+1. In that case the P-SCH sequences, $d_u[n]$, are given by equation 13:

$$d_u[n] = \begin{cases} W_{L+1}^{un(n+1)/2}, & n = 0, 1, \ldots, L/2-1 \\ W_{L+1}^{u(n+1)(n+2)/2}, & n = L/2, \ldots, L-1 \end{cases}, L = 72 \quad \text{eq. 13}$$

The second alternative provides example P-SCH signals with lower maximum cross-correlations.

From the above discussion, it follows that it is beneficial to define the three different example P-SCH sequences, $d_u[n]$, of length 72 as obtained by puncturing the central elements of different ZC sequences of length 73, i.e., as:

$$d_u[n] = \begin{cases} e^{-j\frac{\pi u n(n+1)}{73}}, & n = 0, 1\ldots, 35 \\ e^{-j\frac{\pi u(n+1)(n+2)}{73}}, & n = 36, \ldots, 71 \end{cases} u = 1, 72 \text{ and } 2 \quad \text{eq. 14}$$

Figure 5:
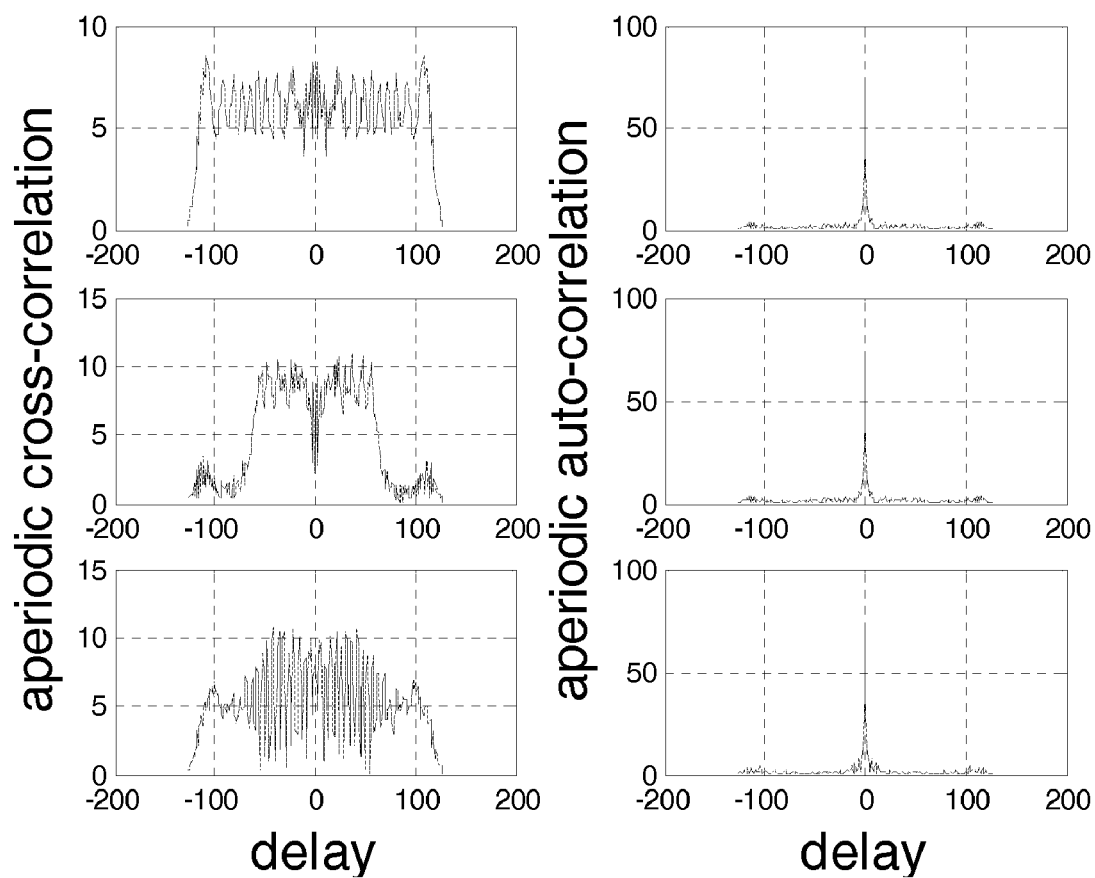
FIG. 5 illustrates, according to an embodiment of the invention, aperiodic correlation functions of P-SCH signals, as specified in equation 14, using 128 samples long correlators.

The aperiodic cross/auto-correlation functions of the P-SCH signals obtained from equation 14, using 128 samples long correlators, are shown in FIG. 5. The PAPR values achieved in accordance with the invention are 2.98 dB, 2.98 dB and 4.43 dB, i.e., better than or corresponding to PAPR-values of prior art.

As the Zadoff-Chu sequence of length L+1 with the root index u3=L+1−u1 is the complex conjugated version of the ZC sequence of the same length with the root index u1, the two corresponding matched filters can be implemented with the multiplication complexity of just one filter.

Specifying a synchronization signal based on Fourier frequency coefficients being centrally symmetric benefits from an insight not revealed in the abovementioned background-documents for RAN WG1 meeting 48bis, namely that transmission of such a synchronization signal provides the advantage of allowing for an efficient implementation of a corresponding bank of correlators in, e.g., a receiver receiving such a signal. This benefit is surprising in view of what can be achieved from the teachings of the prior-art documents.

Another demonstrated merit of an embodiment of the invention is advantageous Peak-to-Average-Power-Ratio, PAPR.

According to an embodiment of the invention, the invention encompasses a transmitter for a communication system, the transmitter being arranged to send a synchronization signal for, e.g., a matched filter receiver in the communication system. The synchronization signal is established from:

defining a set of discrete Fourier frequency coefficients, $H_u[l]$; and transforming the set of discrete Fourier frequency coefficients, $H_u[l]$ into a discrete time representation, $s_u[k]$, where the transmitter preferably is arranged to use the discrete time representation, $s_u[k]$, as the synchronization signal in the communication system.

In an example embodiment, the transmitter is arranged to use the discrete time representation, $s_u[k]$, as the synchronization signal in the communication system. The discrete time representation, $s_u[k]$, is such that the set of discrete Fourier frequency coefficients, $H_u[l]$, is centrally symmetric.

Figure 6:
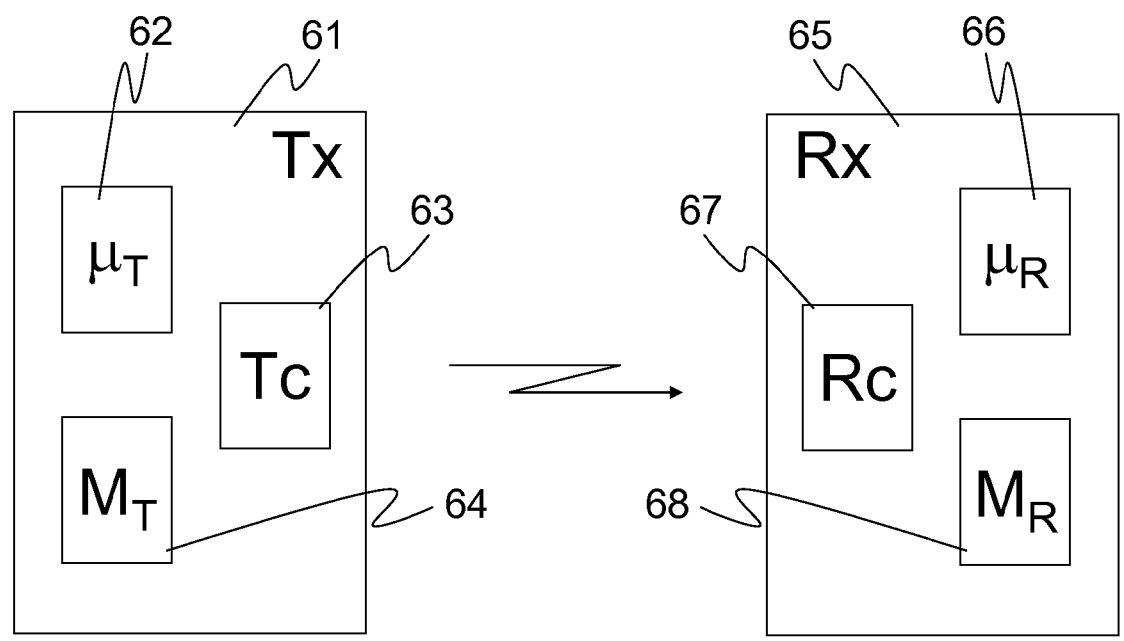
FIG. 6 illustrates schematically a transmitter and receiver of an example communications system according to an embodiment of the invention.

FIG. 6 illustrates schematically a transmitter, Tx, (61) and receiver, Rx, (65) of an example communications system according to the invention.

Basically, the transmitter 61 can be arranged to perform any feature, from a transmitting viewpoint, of the method according to the invention, described above, as desired for a particular application. The transmitter 61 is arranged to use the discrete time representation, $s_u[k]$, as the synchronization signal in the communication system. This implies that it is provided with structures to put the synchronization signal in use. Non-exclusive examples of such structures include electronic memory, M$_T$, (64), a microprocessor, μT, (62) and circuitry for sending electric signals, Tc (63).

In one embodiment of the invention, the invention encompasses a receiver of the matched filter type for a communication system, the receiver being arranged to receive a synchronization signal in the communication system, where the synchronization signal is established from:

defining a set of discrete Fourier frequency coefficients, $H_u[l]$; and transforming the set of discrete Fourier frequency coefficients, $H_u[l]$ into a discrete time representation, $s_u[k]$;

where the receiver preferably is arranged to receive the discrete time representation, $s_u[k]$, as the synchronization signal in the communication system.

In an example embodiment, the receiver is arranged to use the discrete time representation, $s_u[k]$, as the synchronization signal in the communication system. The discrete time representation, $s_u[k]$, is such that the set of discrete Fourier frequency coefficients, $H_u[l]$, is centrally symmetric.

Basically, the receiver 65 can be arranged to perform any feature, from a receiving viewpoint, of the method according to the invention, described above, as desired for a particular application. The receiver is preferably arranged to use the discrete time representation, $s_u[k]$, as the synchronization signal in the communication system. This implies that it is provided with structures to put the synchronization signal into use. Non-exclusive examples of such structures include electronic memory, M$_R$, (68), a microprocessor, μR, (66) and circuitry for receiving electric signals, Rc (67).

In one example embodiment of the invention, the invention encompasses a communication system including:

a transmitter being arranged to send a synchronization signal for an example matched filter receiver; and a receiver, of the example matched filter type, being arranged to receive the synchronization signal, where the synchronization signal is established from:

defining a set of discrete Fourier frequency coefficients, $H_u[l]$; and transforming the set of discrete Fourier frequency coefficients, $H_u[l]$ into a discrete time representation, $s_u[k]$;

where the transmitter preferably is arranged to transmit and the receiver preferably is arranged to receive the discrete time representation, $s_u[k]$, as the synchronization signal. In a preferred mode of the invention, the transmitter and receiver of the communication system are arranged to use the discrete time representation, $s_u[k]$, as the synchronization signal. The discrete time representation, $s_u[k]$, is such that the set of discrete Fourier frequency coefficients, $H_u[l]$, is centrally symmetric.

What is claimed is:

1. A method of establishing a synchronization signal for transmission in a communication system, the method comprising:

defining a set of discrete Fourier frequency coefficients, transforming the set of discrete Fourier frequency coefficients into a discrete time representation, and using the discrete time representation as the synchronization signal in the communication system, wherein the set of discrete Fourier frequency coefficients represents a mapping of a centrally symmetric number sequence onto discrete Fourier frequency coefficients, and the centrally symmetric number sequence, $d_u[n]$, is obtained by puncturing a central element of a Zadoff-Chu sequence of odd length L+1, so that $d_u[n]$ is given by $$d_u[n] = \begin{cases} W_{L+1}^{un(n+1)/2}, & n = 0, 1, \ldots, L/2 - 1 \\ W_{L+1}^{u(n+1)(n+2)/2}, & n = L/2, \ldots, L-1 \end{cases}$$

where $W_N = \exp(-j2\pi/N)$, for positive integer N.

2. The method according to claim 1, wherein the set of discrete Fourier frequency coefficients is a set of Fourier frequency coefficients that is centrally symmetric.

3. The method according to claim 1, wherein the set of discrete Fourier frequency coefficients represents a DC-carrier being zero.

4. The method according to claim 1, wherein the mapping is performed in accordance with $$H_u[l] = \begin{cases} 0, & l = 0 \\ d_u\left[l + \frac{L}{2} - 1\right], & l = 1, 2, \ldots, \frac{L}{2} \\ d_u\left[l - N + \frac{L}{2}\right], & l = N - \frac{L}{2}, \ldots, N - 1 \\ 0, & \text{elsewhere} \end{cases}$$

where, $d_u[n]$, $n=0, 1, \ldots, L-1$, represents the number sequence and L is a length of the number sequence, and $H_u[l]$, $l=0, 1, \ldots, N-1$, represents the discrete Fourier frequency coefficients and N is the number of discrete Fourier frequency coefficients.

5. The method according to claim 4, wherein the number sequence, $d_u[n]$, is of length L and has a property such that $d_u[n]=d_u[L-1-n]$, $n=0, 1, \ldots, L/2-1$.

6. The method according to claim 1, wherein the centrally symmetric number sequence is a punctured Zadoff-Chu sequence of either of three root indices, u, u=u1, u=u2 or u=u3.

7. The method according to claim 6, wherein for a first root index u1, a second root index is L+1−u1.

8. The method according to claim 6, wherein each of the root indices corresponds to a cell-specific synchronization sequence in a cellular communication system.

9. The method according to claim 1, wherein the set of discrete Fourier frequency coefficients are transformed into a discrete time representation, $s_u[k]$, corresponding to:

$$s_u[k] = \frac{1}{N}\sum_{l=0}^{N-1} H_u[l] W_N^{-kl}, \quad W_N = \exp(-j2\pi/N), j = \sqrt{-1},$$

for Fourier frequency coefficients $H_u[l]$, $l=0, 1, \ldots, N-1$, where N is a number of discrete Fourier frequency coefficients of the set.

10. The method according to claim 1, wherein the synchronization signal provides OFDM symbol timing synchronization.

11. A transmitter for a communication system, the transmitter comprising:
a microprocessor adapted to establish a synchronization signal for transmission, the synchronization signal representing:
a set of discrete Fourier frequency coefficients as defined,
the set of discrete Fourier frequency coefficients being transformed into a discrete time representation,
the set of discrete Fourier frequency coefficients being defined to represent mapping of a centrally symmetric number sequence onto discrete Fourier frequency coefficients, and the centrally symmetric number sequence, $d_u[n]$, is obtained by puncturing a central element of a Zadoff-Chu sequence of odd length L+1, so that $d_u[n]$ is given by $$d_u[n] = \begin{cases} W_{L+1}^{un(n+1)/2}, & n = 0, 1, \ldots, L/2-1 \\ W_{L+1}^{u(n+1)(n+2)/2}, & n = L/2, \ldots, L-1 \end{cases}$$

where $W_N=\exp(-j2\pi/N)$, for positive integer N, and
circuitry adapted to send the synchronization signal as established, the circuitry being arranged for sending the synchronization signal corresponding to the discrete time representation in the communication system.

12. A receiver for a communication system, the receiver comprising:
circuitry for receiving a synchronization signal, and a microprocessor being adapted to synchronize the receiver to the synchronization signal, the synchronization signal representing:
a set of discrete Fourier frequency coefficients as defined,
the set of discrete Fourier frequency coefficients being transformed into a discrete time representation,
the set of discrete Fourier frequency coefficients being defined to represent mapping of a centrally symmetric number sequence onto discrete Fourier frequency coefficients, and the centrally symmetric number sequence, $d_u[n]$, is obtained by puncturing a central element of a Zadoff-Chu sequence of odd length L+1, so that $d_u[n]$ is given by $$d_u[n] = \begin{cases} W_{L+1}^{un(n+1)/2}, & n = 0, 1, \ldots, L/2-1 \\ W_{L+1}^{u(n+1)(n+2)/2}, & n = L/2, \ldots, L-1 \end{cases}$$

where $W_N=\exp(-j2\pi/N)$, for positive integer N, and
wherein the circuitry for receiving is arranged for receiving a synchronization signal corresponding to the discrete time representation in the communication system.

13. The receiver according to claim 12, wherein the receiver corresponds to a matched filter type receiver, wherein number of filter coefficients reduced by one corresponds to half the length of the centrally symmetric number sequence.

14. The receiver according to claim 13, wherein the receiver corresponds to a matched filter type receiver, for which filter coefficients correspond to one of a plurality of root indices of a Zadoff-Chu sequence, being arranged for storing filter coefficients for the plurality of root indices.

15. The receiver according to claim 12, wherein the receiver is of matched filter type, and the matched filter is matched to a received signal, transmitted on an AWGN channel.

* * * * *